(No Model.)

W. Y. STANSBROUGH.
GAS METER.

No. 403,297. Patented May 14, 1889.

WITNESSES.
Chas. W. Thomas.
A. Faber du Faur

INVENTOR.
Wilson Y. Stansbrough,
by A. Faber du Faur Jr.
his ATTORNEY.

N. PETERS, Photo-Lithographer, Washington, D. C.

UNITED STATES PATENT OFFICE.

WILSON Y. STANSBROUGH, OF BROOKLYN, NEW YORK.

GAS-METER.

SPECIFICATION forming part of Letters Patent No. 403,297, dated May 14, 1889.

Application filed January 8, 1889. Serial No. 295,773. (No model.)

*To all whom it may concern:*

Be it known that I, WILSON Y. STANSBROUGH, a citizen of the United States, and a resident of Brooklyn, in the county of Kings and State of New York, have invented a new and useful Improvement in Gas-Meters, of which the following is a specification.

My invention relates to improvements in gas-meters, and especially to the class of positive-displacement meters, and has for its object to provide accurate means for measuring the flow of gas, said means at the same time requiring a minimum amount of pressure or force for their operation.

To this end my invention consists in certain novel features of construction, as fully pointed out in the following specification and claims and illustrated in the accompanying drawings, in which—

Figure 1:
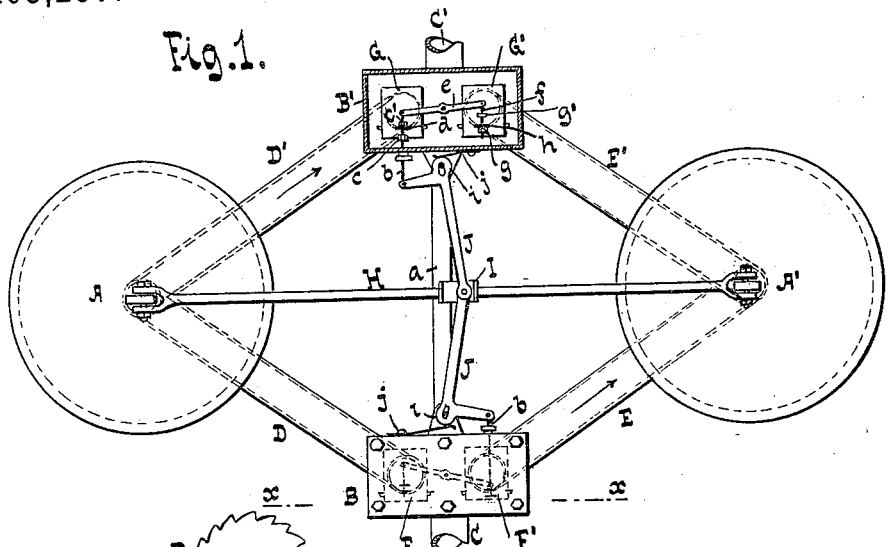
Figure 2:
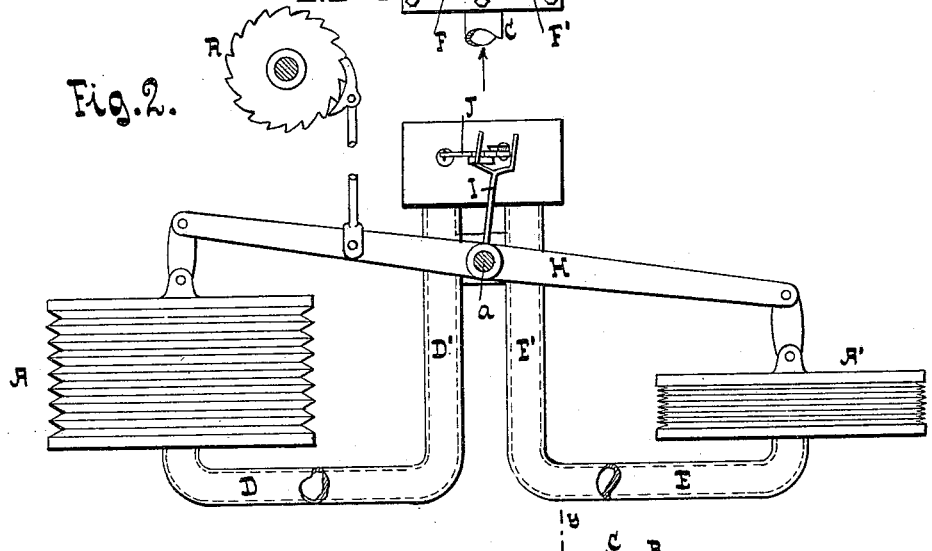
Figures 3, 4:
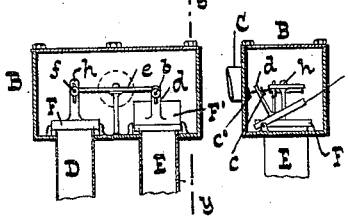

Figure 1 represents a sectional plan or top view of a meter embodying my invention. Fig. 2 is a sectional elevation of the same. Fig. 3 is a vertical section in the plane $x\,x$, Fig. 1. Fig. 4 is a similar section in the plane $y\,y$, Fig. 3.

Similar letters indicate corresponding parts.

In the drawings, the letters A and A' designate two bellows, which are intended to alternately receive and discharge the gas.

B is the receiving-chamber for the gas, and B' is the discharge-chamber, the chamber B being connected with the pipe C from the main and the chamber B' with the distributing-pipe C' to the burners.

From the bottom of the bellows A extends a receiving-pipe, D, leading to the chamber B, and a discharge-pipe, D', leading to the chamber B'. From the bellows A' extends a similar set of pipes, E and E', leading, respectively, to the chambers B and B'. The terminals of the pipes D and E in the receiving-chamber B are closed by valves F and F', and the terminals of the pipes D' and E' in the discharge-chamber B' are closed by similar valves, G and G', said valves being actuated by the movement of the bellows, which is transmitted primarily to a beam, H, and from thence through suitable mechanism to the valves, as will be hereinafter described.

The action of the meter is as follows: In the drawings the bellows A is shown filled with gas, the valves F' and G open, and the valves F and G' closed, so that the gas from the main pipe C enters the receiving-chamber B and passes into the bellows A'. The gas contained in the bellows A at the same time is gradually displaced and discharges through the pipe D', chamber B', and the pipe C'. When the bellows A' is filled, the valves F' and G are closed and the valves F and G' opened. The gas is then caused to pass into the bellows A and is discharged from the bellows A'. In the example shown in the drawings I have shown the terminals of the pipes closed by flap-valves, which are actuated by means as follows: The beam H is pivoted at $a$, Fig. 2, and connected by suitable links with the tops of the bellows. It is provided with a forked arm, I, extending at right angles thereto, which engages with the joint of toggle-levers J, the several members of which are provided with bent ends, which engage with valve-stems $b\,b$, connected to the valves G and F'. These stems pass through suitable stuffing-boxes, and on each of the same are secured adjustable collars $c\,c'$, which are arranged on opposite sides of a lip, $d$, on the valve. The interior terminal of the stem is connected with a lever, $e$, pivoted centrally and connected at its opposite end with a stem, $f$, having thereon collars $g\,g'$, arranged on opposite sides of a lip, $h$, on the valve G', (or F.) The ends of the members of the toggle-lever J are provided with knuckles or cam-surfaces $i$, which engage with flat springs $j\,j$, secured to the walls of the chambers B and B'.

The beam H is connected by any suitable means with a counter or register, R, of any suitable and well-known construction, whereby its vibrations may be recorded; or the pivot or shaft of the beam can be connected with such a register.

The operation of the valve-operating mechanism just described is as follows: As shown in Figs. 1 and 2, the bellows A is expanded and the bellows A' is contracted. As the bellows A' is gradually filled with gas and that in the bellows A is displaced the beam H is vibrated and the forked arm I is swung toward the left from the position shown in Fig. 1, carrying the joint of the toggle-levers J with it, until the members of the same are in a straight line or slightly beyond the same, whereupon the springs $j\,j$ throw the levers by a sudden movement over into a position directly opposite to that shown in Fig. 1, whereby the valves F' and G are closed and the valves F and G' opened.

The collars on the valve-stems are so adjusted that the open valves are closed slightly in advance of the opening of the closed valves.

By the use of the springs $j\,j$, as described, the valves will be actuated at all times after each vibration of the beam, and consequently the meter will never be inactive.

Any suitable locking device may be used to aid in retaining the valves in their open position.

What I claim as new, and desire to secure by Letters Patent, is—

1. A gas-meter comprising in its structure a pair of bellows, valves for controlling the flow of fluid, centrally-pivoted toggle-levers connected with said valves, a beam connected with the bellows and engaging with the toggle-levers, and springs acting on the toggle-levers for completing the movement of the latter to actuate the valves, substantially as described.

2. A gas-meter comprising in its structure a pair of bellows, receiving and discharge pipes, valves controlling the same, toggle-levers connected with said valves, a beam vibrated by the movement of the bellows, an arm on said beam engaging with the joint of the toggle-levers, and springs engaging with cam-surfaces on the ends of said toggle-levers for actuating the valves, substantially as described.

3. In a gas-meter, the combination of a pair of bellows, separate receiving and discharge chambers having pipe-connections with the bellows, as described, four valves controlling the said pipe-connections, a beam vibrated by the movement of the bellows, toggle-levers engaged by the beam, the two members of the toggle-levers being connected, respectively, with two of the valves, and a connection between each of said valves and its companion valve, substantially as described.

4. A gas-meter comprising in its structure a pair of bellows, separate receiving and discharge chambers, two receiving-pipes connected with the receiving-chamber and leading to the respective bellows, two discharge-pipes leading from the respective bellows and terminating in the discharge-chamber, and four valves—one for each pipe—located in the respective chambers, substantially as and for the purpose set forth.

In testimony that I claim the foregoing as my invention I have signed my name, in presence of two witnesses, this 31st day of December, 1888.

WILSON Y. STANSBROUGH.

Witnesses:
    A. FABER DU FAUR, Jr.,
    B. D. THAYER.